(12) United States Patent
Yang et al.

(10) Patent No.: US 10,171,610 B2
(45) Date of Patent: Jan. 1, 2019

(54) WEB CACHING METHOD AND SYSTEM FOR CONTENT DISTRIBUTION NETWORK

(71) Applicant: Telefonica, S.A., Madrid (ES)

(72) Inventors: Xiaoyuan Yang, Madrid (ES); Martin Ivan Levi, Madrid (ES); Carmelo Alexis Acosta Ojeda, Madrid (ES); Eguzki Astiz Lezaun, Madrid (ES); Armando Antonio Garcia Sanchez Mendoza, Madrid (ES); Pablo Rodriguez Rodriguez, Madrid (ES)

(73) Assignee: Telefonica, S.A., Madrid (ES)

( * ) Notice: Subject to any disclaimer, the term of this patent is extended or adjusted under 35 U.S.C. 154(b) by 877 days.

(21) Appl. No.: 14/418,813

(22) PCT Filed: Jul. 29, 2013

(86) PCT No.: PCT/EP2013/065873
§ 371 (c)(1),
(2) Date: Jan. 30, 2015

(87) PCT Pub. No.: WO2014/019970
PCT Pub. Date: Feb. 6, 2014

(65) Prior Publication Data
US 2015/0229733 A1  Aug. 13, 2015

(30) Foreign Application Priority Data
Aug. 2, 2012 (ES) .................... 201231263

(51) Int. Cl.
*G06F 15/16* (2006.01)
*H04L 29/08* (2006.01)
*G06F 17/30* (2006.01)

(52) U.S. Cl.
CPC .... *H04L 67/2842* (2013.01); *G06F 17/30132* (2013.01); *G06F 17/30864* (2013.01);
(Continued)

(58) Field of Classification Search
CPC . H04L 67/2842; H04L 67/02; H04L 67/2852; G06F 17/30132; G06F 17/30902
(Continued)

(56) References Cited

U.S. PATENT DOCUMENTS

| 7,975,025 B1 | 7/2011 | Szabo et al. |
| 2006/0014523 A1* | 1/2006 | Reilly ............... G06F 17/30884 455/412.1 |

(Continued)

*Primary Examiner* — Taylor A Elfervig
*Assistant Examiner* — Oluwatosin M Gidado
(74) *Attorney, Agent, or Firm* — Sughrue Mion, PLLC (57) ABSTRACT

The distribution network comprising a plurality of caching nodes and wherein the web content had been statically identified as an uncacheable content and originated on an origin-server and wherein the method establishes a time to live, TTL, period value to said uncacheable content based on users requests and responds to said users requests by sending to at least one CDN user said uncacheable content within said TTL period value. Each one of said plurality of caching nodes in said distribution network including a content caching manager and a pseudo-dynamic content TTL predictor and performing the following steps:
  a) contacting each one of said plurality of nodes with a centralized repository, in order to download the configuration file of a plurality of said CDN users.
  b) identifying, said content caching manager of each caching node, the uncacheable content as a pseudo-dynamic content;
  c) predicting, a pseudo-dynamic content TTL predictor of said caching node, said TTL period value in which the uncacheable content will not be modified; and
  d) caching, each one of said plurality of nodes, the uncacheable content during said predicted TTL period value.

The system of the invention is arranged to implement the method of the invention.

13 Claims, 8 Drawing Sheets

(52) U.S. Cl.
CPC ........ *G06F 17/30902* (2013.01); *H04L 67/02* (2013.01); *H04L 67/2852* (2013.01)

(58) Field of Classification Search
USPC .......................................... 709/213
See application file for complete search history.

(56) References Cited

U.S. PATENT DOCUMENTS

| | | |
|---|---|---|
| 2007/0156845 A1 | 7/2007 | Devanneaux et al. |
| 2008/0148360 A1* | 6/2008 | Karstens ................ H04L 63/10 |
| | | 726/4 |
| 2008/0183828 A1* | 7/2008 | Sehgal .................... H04W 4/02 |
| | | 709/206 |
| 2009/0150518 A1 | 6/2009 | Lewin et al. |
| 2011/0058490 A1* | 3/2011 | Mills ................... H04L 12/1886 |
| | | 370/252 |
| 2011/0264865 A1* | 10/2011 | Mobarak ............... G06F 12/121 |
| | | 711/141 |
| 2013/0103850 A1* | 4/2013 | Kohli ...................... H04L 65/60 |
| | | 709/231 |
| 2015/0215267 A1* | 7/2015 | Kagan ................. H04L 61/1511 |
| | | 709/245 |

* cited by examiner

WEB CACHING METHOD AND SYSTEM FOR CONTENT DISTRIBUTION NETWORK

CROSS REFERENCE TO RELATED APPLICATIONS

This application is a National Stage of International Application No. PCT/EP2013/065873 filed Jul. 29, 2013, claiming priority based on Spanish Patent Application No. P201231263 filed Aug. 2, 2012, the contents of all of which are incorporated herein by reference in their entirety.

FIELD OF THE ART

The present invention generally relates to caching Web-page content on the Internet, and more specifically, in a first aspect, to a web caching method for content distribution network.

A second aspect of the invention relates to a system arranged to implement the method of the first aspect.

PRIOR STATE OF THE ART

Delivering the current complex web contents to the end-users is challenging and the Content Distribution Networks (CDNs) have been playing a key role on this. By replicating/caching web contents in geographically distributed nodes, CDNs enable online applications to access web contents much faster, providing a higher quality of experience to their users. CDNs are also a key for Internet infrastructure to avoid congestions in critical links by isolating network traffic in multiple separated local areas. This last CDNs' characteristic is extremely important for networking infrastructure growth, where cost of new physical links is significant.

The goodness of a CDN in content access acceleration and network traffic isolation strongly depends on the cacheability the web contents. If a web content cannot be cached, all requests will have to necessary cross critical links back to the origin, introducing extra delays and consuming higher network resources.

The bad news is that low cacheability is one of the natural characteristics of web 2.0. For instance, the 55% of web contents were already potentially indicated to be uncacheable in 2011. Users in Twitter and Facebook are getting web pages with information constantly generated by other users in their own online social network. In this scenario, contents for each user have to be tagged to be uncacheable, since it is unfeasible for backends to foresee end-users' interactions. Online retailers such as eBay [6] are changing product price according to an auction mechanism where each end-user can increase/decrease the final price. Since it is impossible to anticipate online auctions, the product price has to be indicated as uncacheable and end-users have to constantly refresh the web page with product details to get the final price.

A web object tagged as uncacheable does not necessary, however, generate a different content in each user request. In case of eBay, for instance, the product price does not change if there isn't any other user pushing the price during the auction. In case of facebook, the user wall does not change if any friend is posting message. Also, the 46% of potentially uncacheable content does not change during 14 days, according to some studies.

Pseudo-dynamic content can be defined as all those uncacheable web contents that do only change in un-deterministic periods, given a specific geographical area. However, not all uncacheable contents are necessary pseudo-dynamic contents.

Studies have shown that significant parts of current uncacheable contents are really static contents. These contents are tagged as uncacheable due to misconfiguration in web server or lack of performance impact awareness of web system administrators. There are already very good solutions for uncacheable static contents in CDN. In most of CDNs, customers can specify a fixed TTL values for this kind of contents. Once a CDN node downloads the content from the origin, it will be cached for the specified TTL period. There are also proposals like US 2003/0187917 A1 to maximize usefulness of cached contents by selecting the best content source that has the highest expected remaining freshness. The proposed method in US 2003/0187917 A1 requires the existence of multiple sources, for instance multiple proxies and however, is only applicable for to cacheable contents.

There are also uncacheable contents that are really pure dynamic contents. For instance, a counter that indicates the number of web page visitors is clearly a pure dynamic content. For each request, the counter will be increased. Despite that lots of uncacheable contents are static or pure dynamic, significant part of these contents is pseudo-dynamic content whose change event cannot be anticipated.

As response to the explosion of uncacheable web contents, a set of new web-acceleration techniques has been proposed. There are significant techniques that assume all uncacheable contents pure dynamics and contain different optimization mechanisms to reduce the communication time with the origin server. According to the characteristic of optimization mechanisms, all existent techniques can be classified in 3 groups.

The first group contains those techniques that reduce network traffic. Techniques such as JS/CSS minify, HTML structure optimization and on-the-fly compression belong to this category. In the same group are those techniques that can detect partial web content duplicities and remove part of network traffic by only sending control messages.

The second group includes all techniques associated with transmission channel optimization, such as TCP optimization [1], persistent TCP connections [2] and routing optimization. The goal of these techniques is to improve the throughput of TCP channels by: 1) reducing slow-start, 2) avoiding handshake delay, 3) providing channel stability and 4) improving TCP throughput.

In the third group are all those techniques based on prefetching contents from the origin. The idea here is that CDN nodes fetch contents from origin server at same time that other contents are being delivered to the end-user.

There are also other techniques that can complement all above mentioned techniques. DNS optimization, for instance, is part of all web acceleration solutions, both for cacheable and uncacheable contents. Web-masters also play an important role in page acceleration by applying different techniques, such as HTML/JS and DOM simplifying, making AJAX requests cacheable and so on.

There are also ongoing works to change TCP/HTTP protocol, such as SPDY protocol that includes a lot of features for web-site acceleration. There are also techniques specific for the mobile space. Solutions such as Bytemobile provide on-the-fly content transformation to adapt images to device screens.

Problems with Existing Solutions

Although most existent acceleration techniques can reduce the communication time with origin, they cannot completely remove the interaction with the origin server. The notion of pseudo-dynamic content is not taken into account in all-existent techniques. If content is tagged as uncacheable, all requests to this content will require a network request back to the origin. In this sense, most existent techniques assume uncacheable contents are all pure dynamic.

Round Trip Time: The requirement of an interaction with the origin server in each request strongly limits the capacity of CDN to reduce the response time for end-users. In best case, the CDN will still require a full round-trip time (RTT) from end-user to the origin server to deliver the requested content.

Although the average RTT in current Internet is getting smaller with new network infrastructures, the existent technology still requires 9-30 ms in local network communications and 60-200 ms in inter-country links. As consequence, response time of uncacheable contents could be one order of magnitude higher than cacheable contents in CDNs.

TCP protocol: The TCP protocol relays on a congestion window (W) [3] [4] to avoid network link over saturations. In each transmission cycle, the sender sends W packets and waits for an ACK packet before starting the next cycle. The TCP protocol is optimized to adapt the network condition by dynamically changing the value of W.

Furthermore, transmission cycles can be overlapped, so new transmission cycle is normally not blocked by the ACK packet of previous cycle.

The existence of the congesting window determines the amount of data that can be sent in each transmission cycle. By increasing the congesting window, the sender can potentially send all data in only one cycle. However, a big congestion window may potentially increase the error rate and involves extra RTTs for data recovering. According to [1], an initial congesting window of 10 packets achieved a good balance between error rate and performance. For web contents that require more than 10 packets, multiple transmission cycles are still required.

Figure 1:
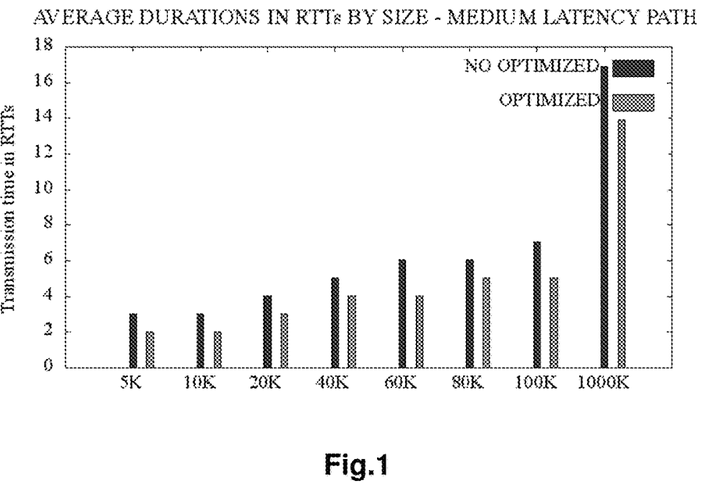
FIG. 1 shows transmission time of web contents depending on content size and TCP optimizations.

FIG. 1 shows the average delivery time (in RTTs) according to object size when the network latency is 160 ms. The figure shows the results both optimized (initial W=10) and non-optimized TCP protocol (initial W=3). As it can be seen, the RTT reduction is significant for small contents. For big web contents, the improvement yielded by increasing the congestion window is however negligible.

Figure 2:
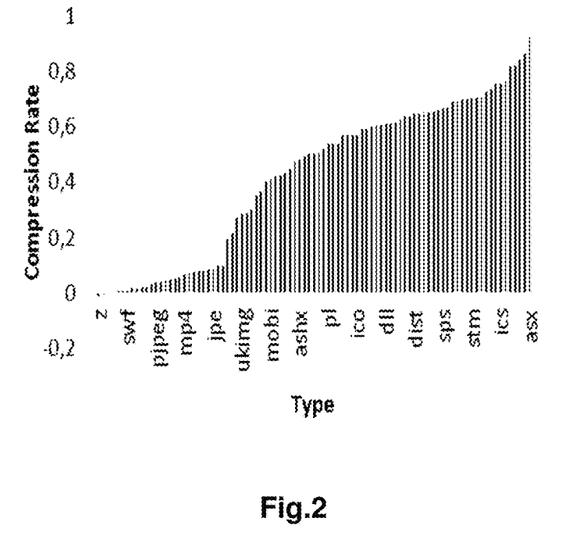
FIG. 2 shows the compression rate of on-fly-compression technique depending on the content type.

Network traffic reduction: The performance of network traffic reduction techniques depends on the existence of information redundancy. FIG. 2 shows the compression rate of on-fly-compression technique over different web content types. According to the results, the compression rate changes, as expected, according to the content type. For example, already-compressed contents (which correspond to 50% of web content), such as jpeg or gzip, cannot be compressed more than 10%. As a consequence, the performance of network traffic reduction techniques is limited.

All above physical limitations plus the current network link stability are determining the upper-limit of the existent web content acceleration techniques that are not able to completely remove the network communication with the origin server.

US 2004/0128346 A1, proposed a method to set time-to-live (TTL) value to uncacheable contents based on user request rate to control the error rate under a probability threshold. Like the method in US 2004/0128346 A1, the present invention also set TTL values to uncacheable contents, however, the present invention design differ from US 2004/0128346 A1 in multiple aspects. First, the system is not agnostic to the content providers. The TTL values are set to uncacheable contents according to content providers' requests. Second, TTL values are calculated not according to average time between changes. Instead, value-predictors are used to detect change patterns. Third, it doesn't complete remove request to the origin by converting uncacheable contents to cacheable. Instead, all requests to the origin are deferred and content change pattern can be quickly detected.

US 2009/150518 A1 proposes a method having the ability to dynamically assemble content at the edge of the Internet, e.g., on CDN edge servers. To provide this capability, preferably the content provider leverages a server side scripting language (or other server-based functionality) to define Web page fragments for dynamic assembly at the edge. In the method proposed in US 2009/15518, in contrast to the present invention, the information indicating if a content being cacheable or not and for how long (equivalent time to the TTL value of the present invention) is defined by the HTTP headers or by other properties, for instance defined by metadata, and therefore established statically. In the present invention, TTL values are dynamically adapted according to user requests and consequently they are not predetermined.

SUMMARY OF THE INVENTION

The object of the present invention is to provide a method and a system for web caching for content distribution network in order to reduce network communication with origin for uncacheable contents.

The concept of pseudo-dynamic content has to be understood as all those uncacheable web contents that do only change in un-deterministic periods, given a specific geographical area. Contents for all requests that belong to the same period and same geographical area are identical. Web servers are, however, not able to anticipate when the content will be changed, therefore the server is forced to indicate the content as uncacheable.

The present invention provides a web caching method for content distribution network (CDN), where the distribution network has a plurality of caching nodes and wherein the web content had been statically identified as an uncacheable content and originated on an origin-server, as per commonly known in the field, the method comprises:
  establishing a time to live, TTL, period value to said uncacheable content based on users requests; and
  responding to said users requests by sending to at least to one CDN user said uncacheable content within said TTL period value, In the method, on contrary to the known proposals, each one of said plurality of caching nodes in said distribution network include a content caching manager and a pseudo-dynamic content TTL predictor and said method further comprises performing the following steps:
  a) contacting each one of said plurality of nodes with a centralized repository, in order to download the configuration file of a plurality of said CDN users.
  b) identifying, said content caching manager of each caching node, the uncacheable content as a pseudo-dynamic content;
  c) predicting, a pseudo-dynamic content TTL predictor of said caching node, said TTL period value in which the uncacheable content will not be modified; and
  d) caching, each one of said plurality of nodes, the uncacheable content during said predicted TTL period value.

According to the invention, said step c) is performed for each one of said plurality of CDN users and all of said user requests for said pseudo-dynamic content are served using a local copy of the configuration file in said centralized repository.

In case said uncacheable content is not pseudo-dynamic, said uncacheable content is forwarded to said CDN user without storing it in said centralized repository.

The web caching method also comprises generating a deferred request to said origin-server for each user request to said pseudo-dynamic content in order to decouple the pseudo-dynamic content downloading.

Then, said deferred requests are independently scheduled and multiple of the deferred requests merged on a single deferred request back to said origin-server.

The result of said generated deferred requests is used for training said pseudo-dynamic content TTL predictor using, in an embodiment, the last TTL values of said generated deferred requests.

In an embodiment, each TTL prediction it further downloads the uncacheable content to determine whether said uncacheable content is really stable, and compares it with the local copy to determine the last TTL prediction result.

In another embodiment, the TTL period value is established depending on content providers' requests.

Finally, the method defines version tags in order to represent different versions of the same uncacheable content.

A second aspect of the invention provides a web caching system for content distribution network (CDN), said distribution network comprising a plurality of catching nodes and wherein a web content are statically identified as an uncacheable content and originated on an origin-server, said system, as per common in the field, comprising:
 a centralized repository, to download the configuration file of a plurality of CDN users; and
 means for establishing a time to live (TTL) period value to said uncacheable content based on users requests of said plurality of CDN users, On contrary of the known proposals, in the system of the invention each caching node of said plurality of caching nodes in said distribution network comprises:
 a content caching manager (1) arranged to identify said uncacheable content as a pseudo-dynamic content; and
 a pseudo-dynamic content TTL predictor (3) arranged to predict said TTL period value in which the uncacheable content will not be modified, wherein the uncacheable content is cached during said predicted TTL period value for each caching node.

According to the invention, a deferred content request manager (4) arranged to send a deferred request to said origin-server for each user request to said pseudo-dynamic content.

Furthermore, it comprises a queue collapser (11) arranged to merge multiple of said deferred requests in one single deferred request and a result collector (22) arranged to validate the pseudo-dynamic content once said deferred request had been downloaded from said origin-server.

The system of the second aspect of the invention implements the method of the first aspect of the present invention.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

The invention is about a web caching system for CDN that can significantly reduce network communication with origin for uncacheable contents. In particular, content change events of uncacheable contents are speculatively predicted, so CDN can deliver these contents without interacting with the origin. As a consequence, response time of uncacheable contents is highly accelerated and network traffic in origin server is efficiently reduced.

The invention includes mechanisms to allow CDN customers to specify the existence of pseudo-dynamic contents. A prediction mechanism is then used to estimate content change period of pseudo-dynamic contents. Furthermore, the prediction is constantly trained with actual values, so the system can adapt to the real content change patterns.

A new web caching mechanism is implemented in a CDN solution that is composed of multiple caching nodes. Each web caching node contacts with a centralized repository to download the configuration file for multiple CDN customers. For each customer, the web caching nodes runs independently the prediction mechanism to estimate the change period of pseudo-dynamic contents. Once the change period is estimated, the web content is considered cacheable for next predicted period. During next period, the caching nodes will serve all requests for the pseudo-dynamic contents using the local copy in the storage. Furthermore, a deferred request to the origin-server is generated for each end-user request to a pseudo-dynamic content. The result of the deferred request is used then to train the prediction mechanism.

Figure 3:
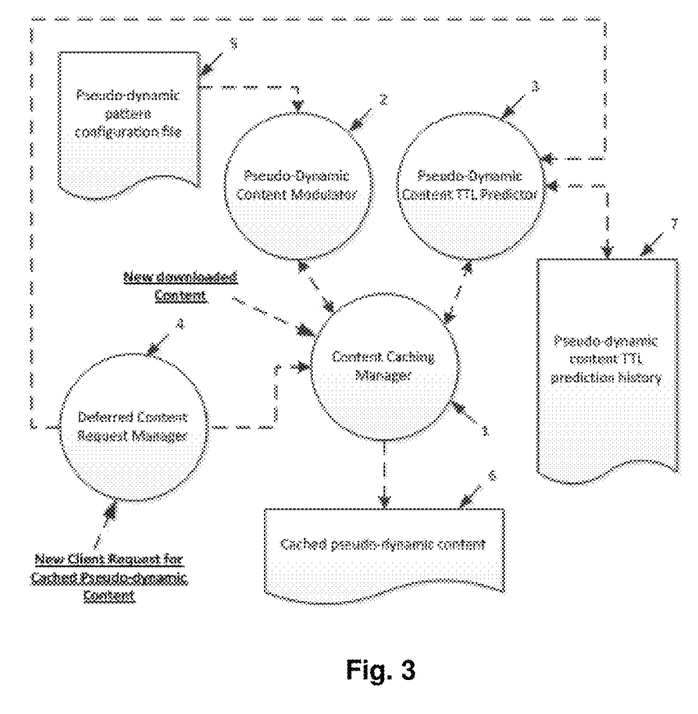
FIG. 3 represents the main components used in the present invention, according to an embodiment.

FIG. 3 shows the main components of the invention. The pseudo-dynamic content caching system is composed of 4 main components: Content Caching Manager (1), Pseudo-Dynamic Content Modulator (2), Pseudo-Dynamic Content TTL Predictor (3) and Deferred Content Request Manager (4).

The components are complemented with 3 data structures (pseudo-dynamic pattern configuration file (5), cached pseudo-dynamic content (6) and pseudo-dynamic content TTL prediction history (7)) that provide both the configuration and state for pseudo-dynamic contents.

The detailed description of all modules will be described in following sections.

Figure 4:
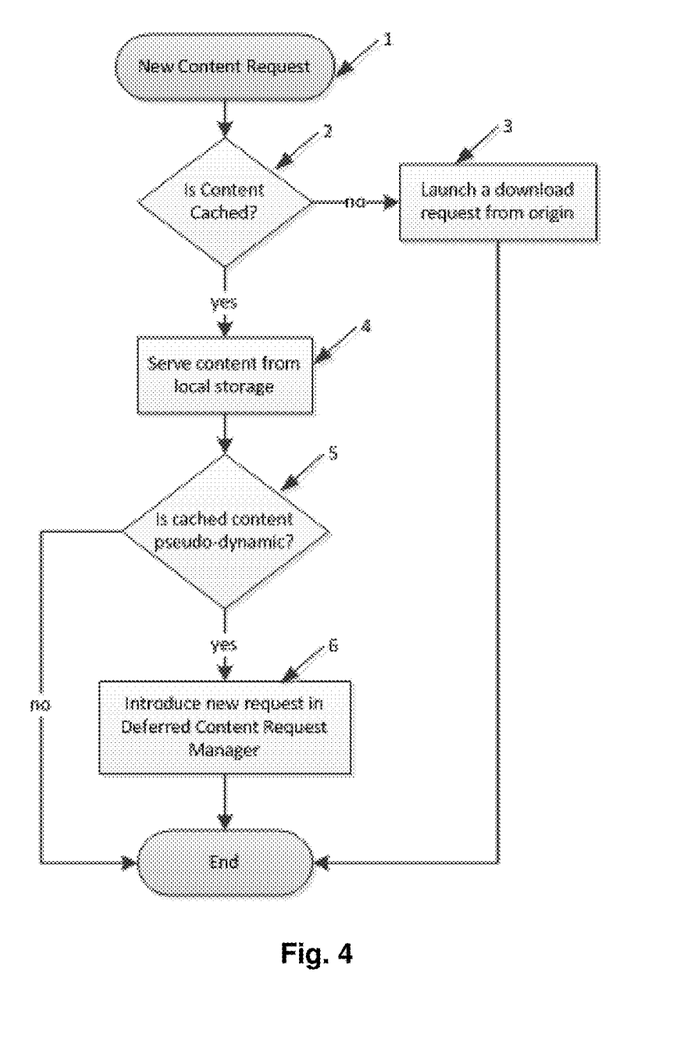
FIG. 4 is a workflow for a new content request from an end-user, according to an embodiment.

Serving a Content Request from an End-User:

FIG. 4 shows the workflow for the web caching node to serve a new request from an end-user. The first action for the web caching node is to check whether the requested content is already cached in the local storage (2). If the content is not cached, the web caching node will launch a new download request from the origin (3). No more action will be performed until the origin answers the request. In the case the content is cached, the node serves the content directly from the local storage (4). If the served cached content is a pseudo-dynamic content (5), a new deferred request will be introduced in the Deferred Content Request Manager (6). Otherwise, no more actions will be required.

Content Caching Manager:

The core component is the Content Caching Manager (CCM). This component is in charge of coordinating all the caching work for a new downloaded content from the origin server.

Figure 5:
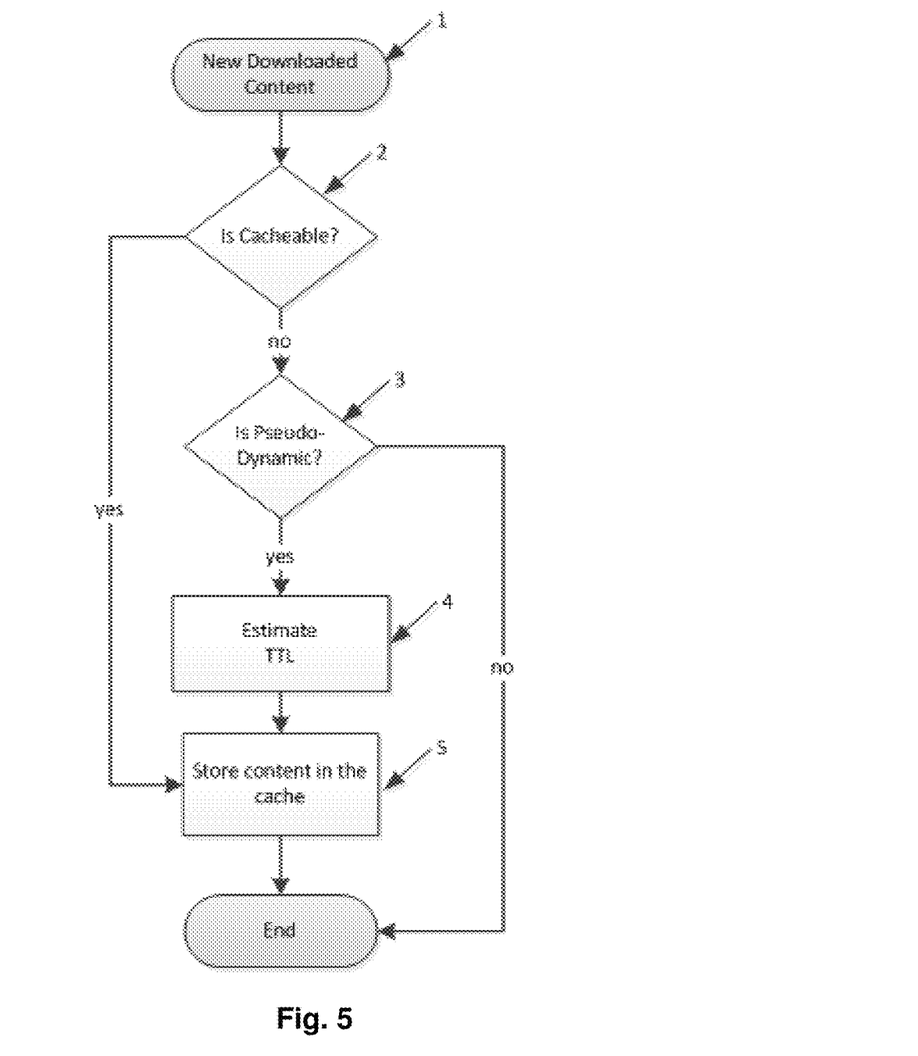
FIG. 5 is a workflow for a new downloaded content from the origin server, according to an embodiment.

FIG. 5 shows the workflow of all required actions in CCM after downloading a new content from the origin server. First, CCM checks the cacheability of the new content in (2). If it is cacheable, it will be cached in the local storage (3) and the process finishes. In case of an uncacheable content, the CCM will verify whether the content is pseudo-dynamic (3). If it is not pseudo-dynamic, the content will be just forwarded to the end-user without storing it in the local disk. If it is a pseudo-dynamic content, the CCM will call pseudo-dynamic content TTL predictor to estimate the next TTL (4). The predicted TTL will be used to cache the content in the storage.

For each cached pseudo-dynamic content, an entry will be included in the Cached Pseudo-Dynamic Content data structure (6 in FIG. 3). Each entry includes following fields:
1. Pseudo-dynamic content identifier: this identifier gives a unique name to each downloaded pseudo-dynamic content.
2. Cached time: is the time when the content is cached.
3. Expiring time: a timestamp that indicates when a content will expire. Expired content must be downloaded again from the origin server to serve a new end-user request.

When a pseudo-dynamic content is removed from the cache, the CCM is also in charge of removing the related entry from the cached pseudo-dynamic content data structure.

Pseudo-Dynamic Content Modulator:

This module identifies whether a new uncacheable content is either a pseudo-dynamic content or a pure dynamic content. The design goal of this module is to give a flexible mechanism to CDN customers to minimize the probability of miss identifications of pseudo-dynamic contents. In order to achieve this goal, a simple data structure is defined: pseudo-dynamic pattern configuration file.

Pseudo-dynamic pattern configuration file contains a list of [P, p, M]. P is a regular expression that represents the pattern for Uniform Resource Identifier (URI) of downloaded contents. The second element of the entry, $p \in [0,1]$, indicates the probability to have a pseudo-dynamic content for all those contents whose URI matches with the pattern P. Pure dynamic contents are all those URIs that matches with P which p=0. The third element is M and represents the maximum value for the predicted TTL in seconds.

The parameter p will modulate the speculativeness of the TTL prediction. With parameter M, CDN customers can specify the maximum confidence for speculated TTL values.

The parameter p and M will be used as input for TTL predictor to coordinate/modulate all the prediction process.

Deferred Content Request Manager:

The goal of the Deferred Content Request Manager (DCRM) is to decouple pseudo-dynamic content downloading (from the origin server) from end-user request serving, so reducing the response time for pseudo-dynamic contents.

For each pseudo-dynamic content cache hit, a deferred request back to origin is generated. The DCRM module schedules the execution of all deferred requests independently and can merge multiple requests in one single request back to origin. The downloaded content is compared with cached one to determine the actual TTL value. The real TTL is then used to train the TTL predictor for better future predictions.

Figure 6:
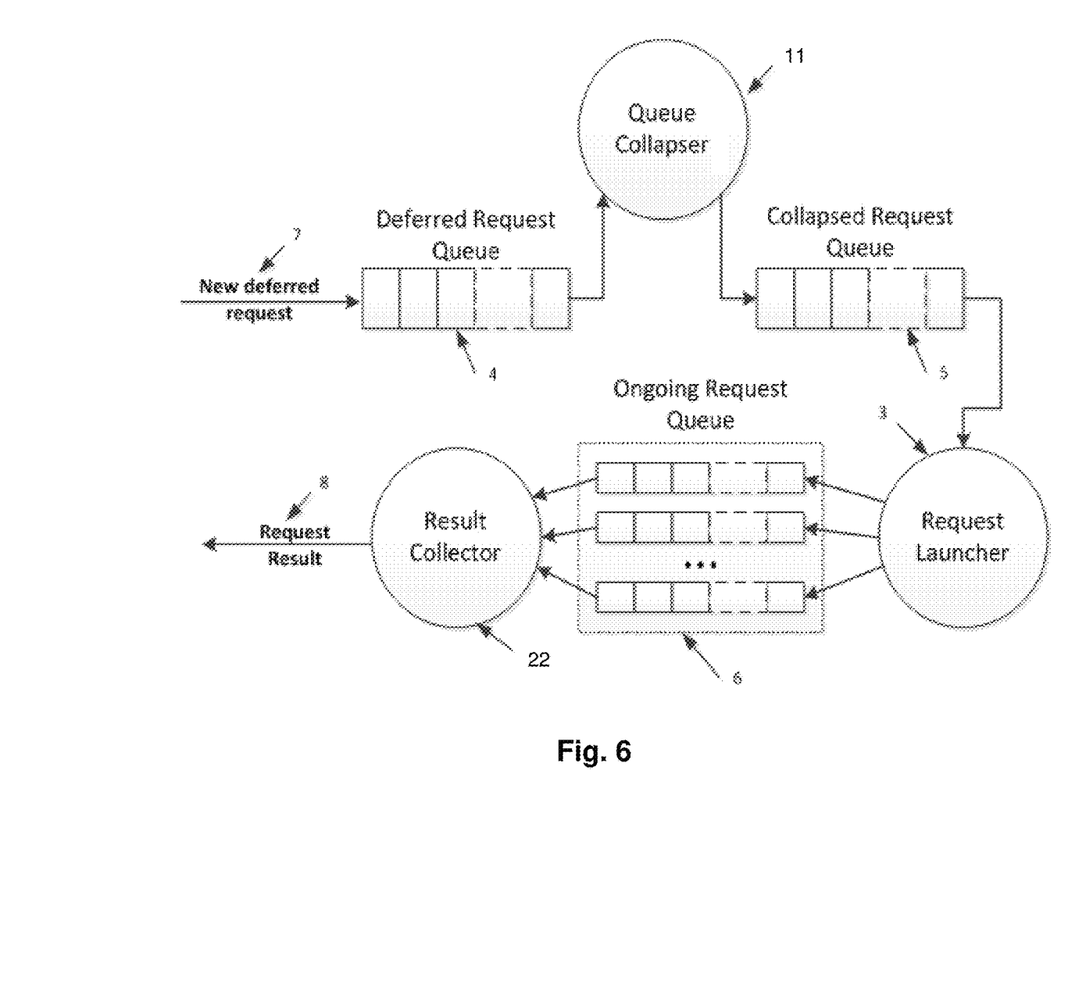
FIG. 6 is the deferred content request manager of the present invention.

The design of the DCRM is showed in an embodiment in FIG. 6. A new deferred request (7) is first inserted in the deferred request queue (4). The queue collapser (1) is in charge of merging multiple requests in one single request. The collapser (1) does this by delaying all requests in the collapsed request queue (5). For each new request, the collapser (1) first checks whether there is already another request in the collapsed request queue (5). If there exist another request to the same content, the new request will be combined with previous requests. All requests in collapsed request queue (5) are eventually scheduled by request launcher (3). Multiple queues in ongoing request queue (6) are used to launch content request in parallel. By setting the number of ongoing request queues, the CDN customers can limit the maximum number of requests to the origin. Once the result of a request is downloaded from the origin, the result collector (2) reports the result to other modules to validate the cached pseudo-dynamic content. Notice that if multiple requests are merged in one request, multiple request results will be reported to TTL predictor for the training purpose.

Figure 7:
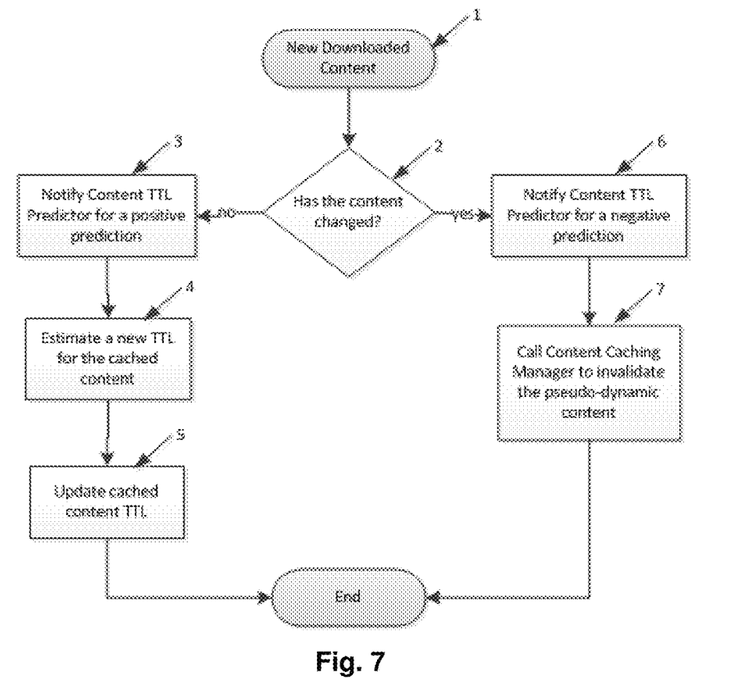
FIG. 7 is a workflow for the result collector after downloading the content of a deferred request, according to an embodiment.
Figure 8:
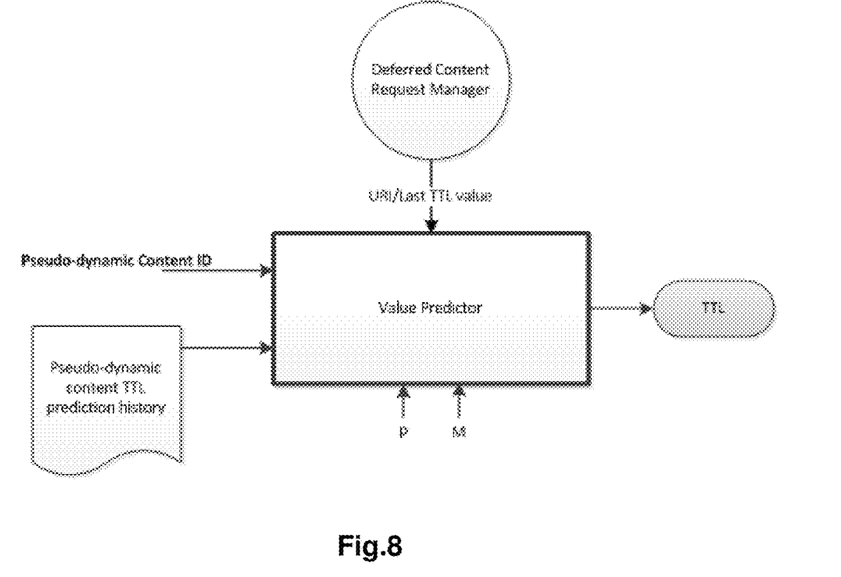
FIG. 8 shows the pseudo-dynamic content TTL predictor of the present invention.

FIG. 7 shows more details about result collector (2) after a deferred request is finished. First, the downloaded content will be compared with cached content with same pseudo-dynamic ID. If the content hasn't changed, the result collector (2) will notify the content TTL predictor for positive prediction (3). Furthermore, a new TTL value will be generated by the predictor (4) and the cached content will be updated with new TTL value (5). In case the content has changed, the result collector first notify the predictor and then invalidate the current cached content. The Content Caching Manager will insert the new downloaded content following the workflow in FIG. 5.

Pseudo-Dynamic Content TTL Predictor:

Given a pseudo-dynamic content, the goal of this module is to predict the value of next TTL. This is the amount of time it is considered an uncacheable content cacheable. The core of this module is a value predictor [5] [6] [7]. The inputs of this value predictor are:
1. The pseudo-dynamic content ID: that uniquely identifies the content.
2. Pseudo-dynamic content TTL prediction history: that contains all the data structure required to produce the next TTL. More information will be provided in the implementation section.
3. The value p and M: are parameters provided by pseudo-dynamic content modulator. These two values modulate the confidence of the system to produce a prediction for a given content. If p=0.0, the predictor will consider the content pure dynamic and always produce TTL=0. When p=1.0, in other hand, the predictor will be fully confident about the prediction mechanism and produce more optimistic values for TTL.

The predictor will be constantly trained by last TTL values from Deferred Content Request Manager. In case of miss-prediction, the predictor will reduce the next predicted TTL. Otherwise, the next TTL will be increased. The parameter M also modulates the prediction by limiting the maximum value of predicted TTL.

According to a preferred embodiment of the present invention, this is implemented in order to create the CDN solution.

Content Caching Manager Implementation Detail:

The web caching solution includes logic to decide if a new content is cacheable.

The current implementation decides whether content is cacheable or not based on the following criteria:
 1. If the request has certain headers avoiding cacheability (i.e. Cache-Control: no-store, etc. . . . ), content is not stored in cache.
 2. If response has http status code different than 200, 203, 206, 300, 301, 410, content is not stored in cache, unless Cache-Control or Expires headers specify it.
 3. If response has certain Cache-Control directives (private, no-store, no-cache) content is not stored.
 4. If response has certain Cache-Control directives (s-maxage, max-age, public) content is stored for cache.
 5. If response has Expiration headers, content is stored for cache.
 6. At this point, in absence of Cache-Control and Expiration headers, content is cacheable with expiration date calculated from validators (LastModified headers).

In order to support user-agent specific contents, the current implementation defines version tags to represents different versions of the same content. If the content is uncacheable, the version tags mechanism guarantees that the tag for each request is different.

Pseudo-Dynamic Content TTL Predictor Implementation Detail:

The core part of Pseudo-Dynamic Content TTL Predictor is the value predictor. The current implementation is inspired by stride predictors [5] [6] [7] [9]. The main idea is to predict the amount of time a pseudo-dynamic content does not change, based on the prior history.

Figure 9:
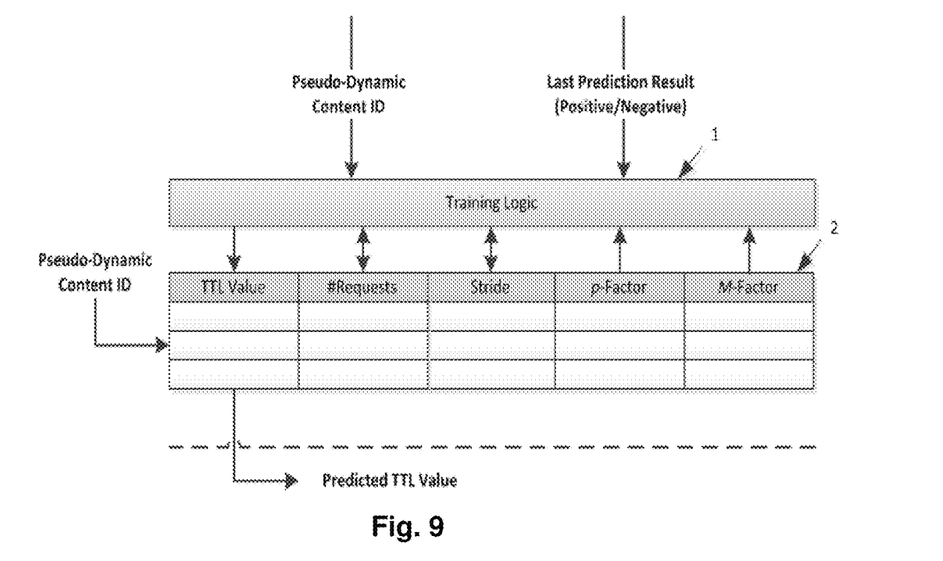
FIG. 9 shows a block diagram of the value predictor implementation for content TTL prediction, according to an embodiment.

A block diagram of the value predictor implementation is shown in FIG. 9. The main part of the predictor is the Pseudo-dynamic Content TTL Prediction History (2). There will be an entry in this table for each cached pseudo-dynamic content. When a pseudo-dynamic content is first encountered, a new entry is inserted in (2). The new entry TTL Value and #Requests field is set to 0. The p-Factor and M-Factor field is set to the corresponding pseudo-dynamic content probability and the maximum value for predicted TTL, as given by Pseudo-Dynamic Content Modulator. The new entry Stride field is set to 0.

By default, each cached pseudo-dynamic content is speculatively predicted as stable (i.e. the content is the same as the cached one). For each prediction, a content download is required in order to determine whether the content is really stable (or it has been missing predicted). This content download is delayed by at most the predicted TTL. Once the content has been downloaded, it is compared with the cached copy to determine the last prediction result: hit or miss. Using this information, the training logic updates the corresponding value and stride. Prediction hits increase the prediction value while misses decrease it. The prediction value is increased or decreased according to the corresponding stride. The stride is modified according to the corresponding p-Factor, M-Factor and last prediction results. High p-Factor values increase or decrease the stride faster than low p-Factor values. The field #Request counts the number of request for the content. This field is used to control the first predictions where value predictor has not yet any history about the pseudo-dynamic content. If the #Request<3, the predicted TTL Value is always 0.

It is possible incorporate confidence estimators, as referenced in [10], in order to improve the prediction training time.

Deferred Content Request Manager Implementation Detail:

Each element in deferred request queue contains all needed information to generate a request to the origin that includes:
 1. URL: for the web content to request.
 2. Request headers: all headers in the user HTTP request, including cookies and other headers in HTTP standard [8].
 3. IP address: of the end-user.
 4. Request Time: a timestamp indicating when the request is performed.

The data structure for elements in collapsed request queue is a list of elements in the deferred request queue, sorted by the Request Time. The request launcher starts a request to the origin when the first end-user request has been queued in the collapsed request queue for more than min(TTL,Q) seconds. In current implementation, it uses a fixed Q=5 seconds, but it can be extended to a dynamic value in future implementations. A dynamic value will able to adapt the request rate to achieve a good balance between the traffic in origin and accuracy of TTL prediction.

In current implementation, the CDN customer provides the ability to setup a maximum number of ongoing requests in the ongoing request queue. The default value is fixed to be 50. The customer has possibility to limit the maximum number of parallel requests from each web caching node.

Advantages of the Invention

The present invention efficiently exploits the existence of pseudo-dynamic contents in current Internet to reduce the load in origin server as well as providing an outstanding low response time to the end-users.

Low Response Time: Compared with other acceleration techniques for uncacheable contents, the invention provides a completely new approach to reduce the response time in web content delivery. Rather than focusing in reducing the RTT of the network and number of transference cycles in the TCP protocol, the invention approach provides the mechanism to decouple the data dependence by converting uncacheable contents into cacheable. As result, the invention approach can completely remove all network delays associated with first mile, being the first mile the network between origin server and web caching node.

The response time reduction ratio of the invention, compared with the best existent acceleration technique for pseudo-dynamic contents showed that the best existent technique ideally can send the content to the end-user in just a RTT (first mile delay+last mile delay). The present invention, on the other hand, can completely remove the delay in first mile, resulting huge response time reduction ratio. For instance, if the origin server is in USA, the web caching node in EU can reduce the response time to EU, in this case the first mile delay is around 170 ms and the last mile delay is about 40 ms, end-users around 80%.

Low Network Load in Origin Server: The data dependence decoupling enables the system to defer data request to origin servers. Multiple deferred requests may then be merged in one single request in the Deferred Content Request Manager, resulting in a significant load reduction in the origin server.

High Flexibility: The pseudo-dynamic content pattern file provides an extremely flexible mechanism for CDN customers to use the present speculative web caching system. The customers can potentially switch on/off the TTL predictions mechanisms for each web content. The syntax of the invention configuration file is simple for the customers and both parameter p and M can be easily determined taking into account the application logic.

Figure 10:
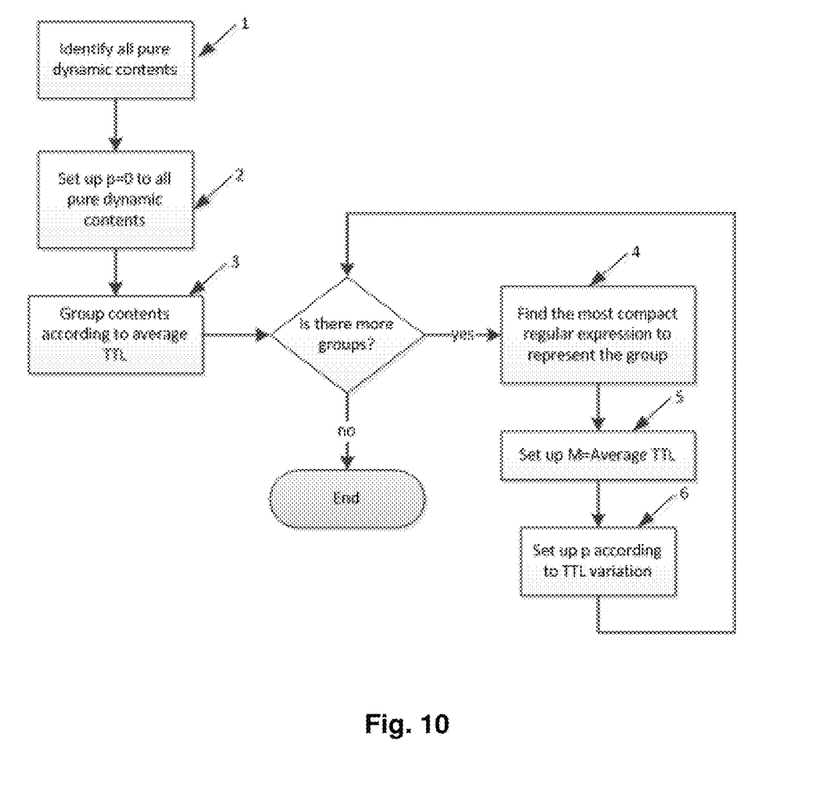
FIG. 10 is a workflow for the CDN customers to create a pseudo-dynamic content pattern file, according to an embodiment.

FIG. 12 shows the workflow for the CDN customers to create the initial pseudo-dynamic content pattern file. The basic idea is to first separate all those pure dynamic contents (1)(2) and then group other pseudo-dynamic contents according to expected average TTL (3). For each group, fix the M parameter to be the average TTL (5) and compute value for p according to some expected TTL variation metric (6). Given the initial pattern file, the customer can fine-tune the system by subdividing groups according to TTL variations. For instance, customers can separate all pseudo-dynamic contents with a very predictable changing period from all those with the same average TTL and set up a very high value for p parameter.

High Accuracy in TTL Prediction: The value predictor is highly effective to predict the TTL for pseudo-dynamic contents. The TTL predictor behavior depends on the p parameter. For example, in an embodiment, the TTL of the pseudo-dynamic content was showed to follow a pattern of 3 stages, where the content was pure dynamic from 8 am to 10 am. The TTL predictor can adapt TTL variation trend in all 3 stages. This is possible because the stride predictor can represent the value variation trends. Using p parameter, it can be effectively changed the behavior of the TTL predictor. Using a higher p-Factor, the value predictor produces more speculative results, whereas a low p-Factor instructs the value predictor to be more conservative. The parameter M also allows the invention to limit the predicted TTL to be less than 200 seconds.

Acronyms

CDN Content Distribution Network
HTTP Hypertext Transfer Protocol
TTL Time to Live
URI Uniform Resource Identifier
URL Uniform Resource Locator

REFERENCES

[1] Dukkipati, N. e. (2010, July). An Argument for Increasing TCP's Initial Congestion Window. ACM Computer Communication Review.
[2] Abhinav Pathak, Y. A. (2010). Measuring and evaluating TCP Splitting for Cloud Services. In Proceedings of the 11th Passive and Active Measurement Conference (PAM 2010)
[3 Vinton G. Cerf, Robert E. Kahn, (May 1974). "A Protocol for Packet Network Intercommunication". IEEE Transactions on Communications 22 (5): 637-648.
[4] RFC 793
[5] Jean-Loup Baer and Tien-Fu Chen. 1995. Effective Hardware-Based Data Prefetching for High-Performance Processors. IEEE Trans. Comput. 44, 5 (May 1995), 609-623.
[6] Yiannakis Sazeides and James E. Smith. 1997. The predictability of data values. In Proceedings of the 30th annual ACM/IEEE international symposium on Microarchitecture (MICRO 30). IEEE Computer Society, Washington, D.C., USA, 248-258.
[7] Srikanth T. Srinivasan and Alvin R. Lebeck. 1998. Load latency tolerance in dynamically scheduled processors. In Proceedings of the 31st annual ACM/IEEE international symposium on Microarchitecture (MICRO 31). IEEE Computer Society Press, Los Alamitos, Calif., USA, 148-159.
[8] RFC 2616
[9] Gabbay, F., Mendelson, A.: Speculative Execution Based on Value Prediction. Technical, Report #1080, Technion, Electrical Engineering Department. (1996)
[10] Aragon, J. L., Gonzalez, J., García, J. M., Gonzalez, A.: Confidence Estimation for Branch Prediction Reversal. In Proc. of the Int. Conference on High Performance Computing (2001).

The invention claimed is:

1. A web caching method for a content distribution network (CDN), said CDN comprising a plurality of caching nodes and wherein the web content is statically identified as an uncacheable content and originates on an origin-server, the method comprising:
    establishing a time to live (TTL) period value to said uncacheable content based on user requests of a plurality of CDN users; and
    responding to said user requests of said plurality of CDN users by sending to at least one CDN user said uncacheable content within said TTL period value,
    wherein each one of said plurality of caching nodes in said CDN includes a content caching manager and a pseudo-dynamic content TTL predictor and in that said method comprises the following steps:
    a) contacting each one of said plurality of caching nodes with a centralized repository in order to download a configuration file of said plurality of CDN users;
    b) identifying, by said content caching manager of each caching node, the uncacheable content as a pseudo-dynamic content;
    c) predicting, by a pseudo-dynamic content TTL predictor of said caching node, said TTL period value in which the uncacheable content will not be modified, the TTL period value being predicted by means of the pseudo-dynamic content TTL predictor at least considering:
        an identifier identifying the uncacheable content,
        a data structure containing prior prediction history and required to produce the TTL period value, and
        two parameters, p and M, provided by a pseudo-dynamic content modulator, modulating confidence of the prediction, said parameter p modulating the speculativeness of the TTL prediction and said parameter M specifying the maximum confidence for speculated TTL period values,
    wherein said step c) is performed for each one of said plurality of CDN users; and
    d) caching, by each one of said plurality of nodes, the uncacheable content during said predicted TTL period value, wherein the method comprises serving all of said user requests for said pseudo-dynamic content using a local copy of the configuration file in said centralized repository.

2. The web caching method of claim 1, characterized in that the method comprises forwarding said uncacheable content to said CDN user without storing said uncacheable content in said centralized repository if said uncacheable content is not pseudo-dynamic.

3. The web caching method of claim 1, characterized in that the method further comprises generating, by a deferred content request manager, a deferred request to said origin-server for each user request to said pseudo-dynamic content in order to decouple pseudo-dynamic content downloading.

4. The web caching method of claim 3, characterized in that the method further comprises independently scheduling said deferred requests and merging multiple of said deferred requests on a single deferred request back to said origin-server.

5. The web caching method of claim 4, characterized in that the method comprises using the result of said generated deferred requests for training said pseudo-dynamic content TTL predictor.

6. The web caching method of claim 5, characterized in that the method comprises training the pseudo-dynamic content TTL predictor with last TTL values of said generated deferred requests.

7. The web caching method of claim 1, characterized in that for each TTL prediction the method further comprises downloading said uncacheable content to determine whether said uncacheable content is stable, and comparing said uncacheable content with the local copy to determine a last TTL prediction result.

8. The web caching method of claim 1, characterized in that the method comprises establishing said TTL period value depending on content providers' requests.

9. The web caching method of claim 1, characterized in that the method defines version tags in order to represent different versions of the same uncacheable content.

10. A web caching system for a content distribution network (CDN), said CDN comprising a plurality of caching nodes and wherein a web content is statically identified as an uncacheable content and originates on an origin-server, said system comprising:

a centralized repository to download a configuration file of a plurality of CDN users; and means for establishing a time to live (TTL) period value to said uncacheable content based on user requests of said plurality of CDN users, wherein each caching node of said plurality of caching nodes in said CDN comprises:

a content caching manager arranged to identify said uncacheable content as a pseudo-dynamic content; and a pseudo-dynamic content TTL predictor arranged to predict said TTL period value in which the uncacheable content will not be modified by means of at least considering:

an identifier identifying the uncacheable content, a data structure containing prior prediction history and required to produce the TTL period value, and two parameters, p and M, provided by a pseudo-dynamic content modulator, modulating confidence of the prediction, said parameter p modulating the speculativeness of the TTL prediction and said parameter M specifying the maximum confidence for speculated TTL values, wherein the pseudo-dynamic content TTL predictor is arranged to predict respective TTL period values for each of the plurality of CDN users;

wherein said uncacheable content is cached during said predicted TTL period value for each caching node, and wherein all of said user requests for said pseudo-dynamic content are served using a local copy of the configuration file in said centralized repository.

11. The web caching system of claim 10, characterized in that the system comprises a deferred content request manager arranged to send a deferred request to said origin-server for each user request to said pseudo-dynamic content.

12. The web caching system of claim 11, characterized in that the system comprises a queue collapser arranged to merge multiple of said deferred requests in one single deferred request.

13. The web caching system of claim 12, characterized in that the system further comprises a result collector arranged to validate the pseudo-dynamic content once said deferred request had been downloaded from said origin-server.

* * * * *